(12) United States Patent
Okita et al.

(10) Patent No.: US 7,443,468 B2
(45) Date of Patent: Oct. 28, 2008

(54) LIQUID CRYSTAL DISPLAY DEVICE

(75) Inventors: Mitsutaka Okita, Mattou (JP);
Kazuhiro Nishiyama, Kanazawa (JP);
Daiichi Suzuki, Ishikawa-gun (JP);
Shigesumi Araki, Ishikawa-gun (JP)

(73) Assignee: Toshiba Matsushita Display Technology Co., Ltd., Tokyo (JP)

(*) Notice: Subject to any disclaimer, the term of this patent is extended or adjusted under 35 U.S.C. 154(b) by 0 days.

(21) Appl. No.: 10/577,059

(22) PCT Filed: Oct. 21, 2004

(86) PCT No.: PCT/JP2004/015584

§ 371 (c)(1),
(2), (4) Date: Dec. 12, 2006

(87) PCT Pub. No.: WO2005/038515

PCT Pub. Date: Apr. 28, 2005

(65) Prior Publication Data

US 2007/0076144 A1    Apr. 5, 2007

(30) Foreign Application Priority Data

Oct. 22, 2003    (JP) .............................. 2003-362343

(51) Int. Cl.
*G02F 1/1335*    (2006.01)

(52) U.S. Cl. ...................... 349/107; 349/141; 349/144; 349/109

(58) Field of Classification Search ................. 349/107, 349/141
See application file for complete search history.

(56) References Cited

U.S. PATENT DOCUMENTS 5,013,138 A * 5/1991 Roosen et al. ............... 349/107

(Continued)

FOREIGN PATENT DOCUMENTS

CN    1160222 A    9/1997

(Continued)

OTHER PUBLICATIONS

U.S. Appl. No. 10/582,237, filed Jun. 9, 2006, Araki, et al.

(Continued)

*Primary Examiner*—Frank G Font
*Assistant Examiner*—Eric Wong
(74) *Attorney, Agent, or Firm*—Oblon, Spivak, McClelland, Maier & Neustadt, P.C.

(57) ABSTRACT

A liquid crystal display cell (110) includes: an opposing substrate (130) having an opposing electrode (Ecom); an array substrate (120) having a pixel electrode Dpix for each color; a liquid crystal layer (140) arranged in a bend arrangement located between the opposing substrate (120) and the array substrate (120); and red, green, and blue filter layers (CF(R), CF(G), CF(B)) arranged on one of the substrates. Distances (dB, dG, dR) between the pixel electrodes of the respective colors (dpixR, dpixG, dpixB) and the opposing electrode (Ecom) are set as follows: dB<dR, dB.

10 Claims, 15 Drawing Sheets

U.S. PATENT DOCUMENTS

| | | | |
|---|---|---|---|
| 6,661,484 B1* | 12/2003 | Iwai et al. | 349/107 |
| 6,842,207 B2* | 1/2005 | Nishida et al. | 349/107 |
| 7,002,647 B2* | 2/2006 | Tanaka | 349/107 |
| 7,042,543 B2* | 5/2006 | Komatsu | 349/141 |
| 2001/0022569 A1* | 9/2001 | Ohta et al. | 345/88 |
| 2003/0011729 A1* | 1/2003 | Song et al. | 349/107 |
| 2004/0046911 A1* | 3/2004 | McKnight | 349/113 |

FOREIGN PATENT DOCUMENTS

| | | |
|---|---|---|
| JP | 61-121033 | 6/1989 |
| JP | 9-146086 | 6/1997 |
| JP | 9-230332 | 9/1997 |
| JP | 2003-5204 | 1/2003 |
| JP | 2003-228069 | 8/2003 |

OTHER PUBLICATIONS

U.S. Appl. No. 10/577,045, filed Apr. 24, 2006, Suzuki, et al.
U.S. Appl. No. 10/577,059, filed Apr. 24, 2006, Okita, et al.

* cited by examiner (a)

(b)

LIQUID CRYSTAL DISPLAY DEVICE

TECHNICAL FIELD

The present invention relates to a liquid crystal display device, and more particularly to a liquid crystal display device employing the optically compensated birefringence (OCB) technology enabling realization of a wide viewing angle and high speed response.

TECHNICAL BACKGROUND

Liquid crystal display devices are put in practical use in various application fields with taking advantage of the characteristics thereof such as lightweight, a thin outline, and less power consumption.

Twisted nematic (TN) type liquid crystal display devices now widely utilized in the market have a structure in which liquid crystal material thereof having optically positive refractive index anisotropy is arranged between the substrates in such a manner as to be twisted by approximately 90 degrees, so that optical rotatory property of the incident light is regulated upon controlling the twisted alignment. Although the TN type liquid crystal display device can be manufactured comparatively easily, it is not suitable to display moving pictures such as TV images because the viewing angle is narrow and the response speed is slow.

For improving the viewing angle and the response speed, on the other hand, the OCB type liquid crystal display device has been focused on. The OCB type liquid crystal display device, which has a liquid crystal material capable of forming bend alignment sealed between the substrates, has some advantages that the response speed can be improved by one digit in comparison with the TN type liquid crystal display device and furthermore the viewing angle can be widened because it is optically self-compensated thanks to the alignment condition of the liquid crystal material. When image display is carried out with use of the OCB type liquid crystal display device, it is considered upon controlling birefringence and combining with an alignment layer that the light is shut off (the black display) in the condition where a higher voltage is applied thereto, or passes therethrough (the white display) in the condition where a lower voltage is applied thereto. In this case, it is well known that phase difference of the liquid crystal layer in the black display condition is compensated and the transmittance is sufficiently diminished upon, for example, combining with a single-axial phase difference plate.

Though liquid crystal molecules are arranged along the direction of electric field (in the direction normal to the substrate) by applying a higher voltage in the black display condition, liquid crystal molecules in the vicinity of the substrate are not arranged in the normal direction to the substrate due to the interaction with the orientation film, so that the light is affected by the phase difference in the specified direction. As a result, when observation is carried out from the direction normal to the substrate (the front direction of the display screen), the transmittance in the black display condition cannot be sufficiently decreased, so that the above phenomenon gives rise to deterioration of the contrast. As disclosed, for example, in the Patent Document 1, combining with a hybrid arranged optically negative phase difference plate is known as a measure to compensate sufficiently the black display or gray scale characteristicts for the observation in the front direction and moreover the oblique direction. Furthermore, the Patent Document 2 describes that the thickness of liquid crystal layer of each color region is varied to improve the brightness of each color pixel for the general TN type liquid crystal display device.

Patent Document 1: Japanese Laid-open Patent Publication Hei10-197862

Patent Document 2: Japanese Laid-open Patent Publication 2003-5204

DISCLOSURE OF THE INVENTION

Problems to be Solved by the Invention

The color liquid crystal display device forms an image with an incident light such as the natural light or a back light with high color rendering reflected or transmitted through each color filter layer, wherein lights spreading over the whole light wavelength region are selected by the wavelength pass band of each filter layer.

As the optical rotatory property is utilized for display in the TN type liquid crystal display device, internal reflection of the light between the substrates has little effect on the display. However in the OCB liquid crystal display device, retardation of the incident light passing through the liquid crystal layer disagrees with retardation of the phase difference plate due to the number of times of the internal reflection. This causes a problem that the balance of color is disrupted. Moreover, because the internally reflected light also has wavelength dispersion, disruption of balance of the balance of color gets more and more increased. Especially, because blue light of short wavelength is greatly affected by the wavelength dispersion, the image is liable to be tinged with blue in the black display. The Patent Document 2 cannot decrease the tinge of blue in the OCB liquid crystal display device.

The present invention is intended to provide a liquid crystal display device that has a high response speed and an excellent balance of color.

Means to Solve the Problems

The present invention specifies the gap distance between the electrodes interposing the thickness of liquid crystal layer i.e. substantially the liquid crystal layer in accordance with the spectral components passing through the liquid crystal display cell. In accordance with the above, color balance is regulated upon compensating an unnecessary light leaking from the blue filter with other colors.

Red, green, and blue lights of the spectrum mentioned here correspond to wavelength regions passing through respective color filter layers, e.g. red light of 580 nm or more, green light of 510 to 580 nm, and blue light of 400 to 550 nm.

The present invention provides a liquid crystal display device comprising:

an array substrate having a pixel electrode for each color of red, green and blue arranged in a matrix form;

an opposing substrate having an opposing electrode arranged in such a manner as to face the pixel electrodes of the array substrate;

a liquid crystal layer arranged in a bend alignment interposed between the array substrate and the opposing substrate; and a filter comprising a red filter layer, a green filter layer and a blue filter layer provided on one side of the substrate, the red filter layer being arranged corresponding to the red pixel electrode, the green filter layer being arranged corresponding to the green pixel electrode, and the blue filter layer being arranged corresponding to the blue pixel electrode, wherein a gap distance between the blue pixel electrode and the opposing electrode is different from a gap distance between the red pixel electrode and the opposing electrode, and also different from a gap distance between the green pixel electrode and the opposing electrode, and $dB<dR, dB<dG,$ $|dB-dR|\leq 0.4$ μm, and $|dB-dG|\leq 0.4$ μm are satisfied where the gap distance between the blue pixel electrode and the opposing electrode is represented by dB; the gap distance between the red pixel electrode and the opposing electrode is represented by dR; and the gap distance between the green pixel electrode and the opposing electrode is represented by dG.

Furthermore, it is desirable that dB<dR and dB<dG can be satisfied, where the gap distance between the blue pixel electrode and the opposing electrode is represented by dB; the gap distance between the red pixel electrode and the opposing electrode is represented by dR; and the gap distance between the green pixel electrode and the opposing electrode is represented by dG.

Moreover, it is possible that dR and dG are equal to each other.

As an embodiment to realize the above, a structure in which at least the thickness of the blue filter layer is greater than the thickness of the red and green filters will be provided.

It is preferred for the filter to be located on the array substrate.

It is also preferable that the filter is located on the opposing substrate.

The present invention further provides a liquid crystal display device comprising a liquid crystal display cell comprising
an array substrate having pixel electrodes for each color of red, green and blue arranged in a matrix form on a display screen,
an opposing substrate having an opposing electrode arranged in such a manner as to face the pixel electrodes of the array substrate,
an orientation film formed on both the pixel electrodes and the opposing electrodes, and having a liquid crystal orientation surface in a direction vertical to the display screen,
a liquid crystal layer interposed between the array substrate and the opposing substrate, and arranged in a bend alignment oriented in a direction vertical to the display screen, and
a filter comprising a red filter layer, a green filter layer and a blue filter layer provided on one side of the substrate, the red filter layer being arranged corresponding to the red pixel electrode, the green filter layer being arranged corresponding to the green pixel electrode, and the blue filter layer being arranged corresponding to the blue pixel electrode, wherein a gap distance between the blue pixel electrode and the opposing electrode of the liquid crystal display device is different from a gap distance between the red pixel electrode and the opposing electrode, and also different from a gap distance between the green pixel electrode and the opposing electrode;
a phase difference plate arranged on at least one of main surfaces of the liquid crystal display cell;
a pair of alignment layers arranged so as to interpose the liquid crystal display cell and the phase difference plate in the crossed-Nicol configuration crossing at approximately 45 degrees to each other in a direction vertical to the display screen; and a means for satisfying $LRB/(LRR+LRG+LRB)<0.45,$ where ratios of brightness of each color light in directions of 60 degrees right and left to that in the front direction of the display screen are represented by LRR for red light, LRG for green light and LRB for blue light respectively.

The OCB mode display relating to the present invention is to control the phase of passing light upon combining the liquid crystal display cell with the phase difference plate and varying the summation of retardation values thereof, and represented by the following:

$Re=(no-ne)d=\Delta n \cdot d,$ where the retardation value of the liquid crystal display cell is represented by Re.

Here, 'no' denotes ordinary index; 'ne' denotes extraordinary index; and 'd' denotes thickness of the liquid crystal layer. The OCB liquid crystal layer employing p type liquid crystal having positive dielectric anisotropy has a positive retardation value, and the phase difference plate combined with the liquid crystal layer above has a negative retardation value.

As shown in FIG. 21, when the liquid crystal display panel is composed of the liquid crystal display cell 11, the phase difference plate 20 and a pair of the alignment layers 22 arranged in the crossed-Nicol configuration to each other, light transmittance (T) is represented as follows:

$(T) \propto \sin 2(Ret(V,\lambda)/\lambda),$ where Ret denotes summation of retardation values of the liquid crystal layer and the phase difference plate; V denotes voltage supplied to the liquid crystal layer; and λ denotes wavelength of the light.

FIG. 16 shows an example of the retardation values of the liquid crystal layer and the phase difference plate (film) used in the OCB mode display to the wavelength λ, normalized by light wavelength of 550 nm. Because the characteristic A of the liquid crystal layer is generally not in agreement with the characteristic B of the phase difference plate due to the materials thereof being different from each other, dispersion ratios thereof are different. Although the wavelength dispersions have the same tendency that it becomes greater at the short wavelength side, the characteristics thereof are greatly different from each other.

FIG. 17 shows the brightness ratios at any viewing angle (deg) tilted in a right or a left direction to the front direction for the liquid crystal display device containing liquid crystal cells of uniform thickness, where brightness of red, green and blue in the black display is normalized by the brightness of each color in the front direction of the display screen. It is recognized that there is a great disparity between the blue brightness ratio and the red, green brightness ratios in the right and left directions, especially 60 degrees to the right.

In FIG. 19 showing a u'v' chromaticity diagram, point A denotes the front in the white display; point B denotes the front in the black display; and point C denotes 60 degrees to the right in the black display, showing it shifted largely from the front to the blue side at the viewing angle of 60 degrees to the right.

Accordingly, as shown in the figure, the point C of 60 degrees to the right has to be moved in the vicinity of the point B in order to ensure that the chromaticity of 60 degrees to the right be equal to that of the front. That is to say, as shown in FIG. 18, upon having the red and green brightness ratios access to the blue brightness ratio that becomes the maximum at 60 degrees to the right, the chromaticity in the vicinity of the point B in FIG. 19 can be ensured.

According to the present invention, a displayed image from an oblique viewing angle with good color balance can be obtained by selecting the brightness ratios so as to satisfy $$LRB/(LRR+LRG+LRB)<0.45,$$

where LRR, LRG and LRB represent brightness ratios of red, green and blue lights respectively in the direction of 60 degrees to the left and right from the front direction.

The present invention suppresses the tinge of blue in the image upon varying the thickness of the liquid crystal layers of the pixels corresponding to respective colors, in other words, the gap distance between the electrodes for respective color pixels and the opposing electrodes in order to improve the color balance.

Effects of the Invention

The present invention can suppress the tinge of blue in the displayed image in the black display, which is noticeable in an oblique viewing angle, especially in the right or left direction of the displayed image for the OCB mode liquid crystal display.

PREFERRED EMBODIMENTS TO IMPLEMENT THE INVENTION

Referring to the drawings, a liquid crystal display device as an embodiment of the present invention will be explained hereinafter.

Embodiment 1

FIG. 1 shows a schematic block diagram of the liquid crystal display device according to the OCB mode system of the embodiment.

The liquid crystal display device 1 having the aspect ratio of 16:9 and the diagonal of 22 inches comprises a liquid crystal display panel 100 of light transmission active matrix type, a backlight 300 constituted of a plurality of tubular light sources 310 arranged in parallel together (Refer to FIG. 11) and located at the back of the liquid crystal display panel, scanning line drive circuits Ydr1, Ydr2 (Refer to FIG. 4) accommodated in the liquid crystal display panel 100 and supplying a scan signal Vg to a scanning line Yj, a signal line drive circuit 500 comprised of TCP (Tape Carrier Package) supplying a signal voltage Vsig to a signal line Xi (Refer to FIG. 4), an opposing electrode drive circuit 700 supplying an opposing electrode voltage Vcom to an opposing electrode Ecom (Refer to FIG. 2), and a control circuit 900 controlling the scanning line drive circuits Ydr1, Ydr2, the signal line drive circuit 500 and the opposing electrode drive circuit 700. The liquid crystal display panel 100 is interposed by a backlight 300 and a frame-like bezel 1000.

As shown in FIG. 3, the liquid crystal display panel 100 comprises a liquid crystal display cell 110, a front hybrid phase difference plate 200a, a front double-axial phase difference plate 210a, a front alignment layer 220a, a rear hybrid phase difference plate 200b, a rear double-axial phase difference plate 210b and a rear alignment layer 220b. The front hybrid phase difference plate 200a, the front double-axial phase difference plate 210a and the front alignment layer 220a are integrally composed, and the rear hybrid phase difference plate 200b, the rear double-axial phase difference plate 210b and the rear alignment layer 220b are also integrally composed, and then they are stuck on both the main surfaces of the liquid crystal display cell 110.

<Composition of the Liquid Crystal Display Cell>

As shown in FIG. 2, the liquid crystal display cell 110 is composed of an array substrate 120 having pixel electrodes for display Dpix, an opposing substrate 130 having an opposing electrode Ecom located facing the pixel electrodes for display Dpix on the array substrate, an orientation films 151, 153 coated on the electrodes Dpix, Ecom between the array substrate 120 and an opposing substrate 130, and a liquid crystal layer 140 interposed via the orientation films.

On the main surface of the opposing substrate 130, a light shield layer BM, a red filter layer CF(R), a green filter layer CF(G), and a blue filter layer CF(B) are regularly arranged. The pixel electrode for display Dpix is an electrode forming one pixel with a trio of a pixel electrode for red dpixR, a pixel electrode for green dpixG, and a pixel electrode for blue dpixB, all of them being defined as respective sub-pixels, provided on the array substrate.

The thickness of each filter layer decreases in the order of blue, green and red. Therefore, the distance of the gap between each color pixel electrode and the opposing electrode differs from each other. When the gap distance between the red pixel electrode dpixR and the opposing electrode Ecom is denoted by dR; the gap distance between the green pixel electrode dpixG and the opposing electrode Ecom is denoted by dG; and the gap distance between the blue pixel electrode dpixB and the opposing electrode Ecom is denoted by dB, the relation among them is shown as follows:

$$dB<dG<dR.$$

In consequence, the thickness of the liquid crystal layer 140 becomes the smallest at the position of blue pixel electrode, and increases in the order of the position of green pixel electrode and the position of red pixel electrode. Actually, the thickness of the liquid crystal layer is smaller than the above-mentioned gap distance between both electrodes by the thickness of the orientation film.

In the above case, the gap distances mentioned above are dB=4.8 μm, dG=5.0 μm, and dR=5.1 μm. Nematic liquid crystal with positive dielectric anisotropy is employed for the liquid crystal layer, and the retardation value is set to be 80 nm.

As explained by FIG. 17, an image of the display screen observed from an oblique direction has the blue brightness ratio LRB that becomes approximately the maximum at the viewing angle of 60 degrees to the right and left. The color balance is broken at the viewing angle mentioned above, so that a display tinged with blue is noticeably observed especially in the black display.

The reason why the gap distances dG, dR are set to be larger than the gap distance dB is that the color balance of observation from an oblique direction can be moved closer to that of the point B of the observation from the front direction as shown by the point B in FIG. 19. The red brightness ratio LRR and the green brightness ratio LRG at the viewing angle of 60 degrees and the vicinity are moved closer to the blue brightness ratio LRB as shown in FIG. 18.

In consequence of the brightness ratio having been raised, disagreement of the color balance of the displayed image is avoided, so that clear images can be obtained even if observation is carried out from an oblique direction. Increase of the brightness ratios LRR and LRG causes rising of the black display level. Although the black display level is raised and so-called 'light leakage black state' gets large due to the increase of the brightness ratios LRR and LRG, there is no problem with respect to visibility if it is within a certain extent.

<Structure of the Array Substrate>

Referring to FIG. 2 to FIG. 10, the array substrate 120 will be explained.

The array substrate 120 has a transparent glass substrate GLS1 on which a plurality of signal lines Xi formed by aluminum (Al) and a plurality of scanning lines Yj formed by molybdenum-tungsten alloy (MoW) are arranged in a matrix form via an inter-layer insulator film INS2 of silicon oxide ($SiO_2$) film. Additionally, auxiliary capacitance lines Cj prepared in the same process as the scanning lines Yj are located in parallel with the scanning lines Yj.

In the vicinity of the intersection of the signal line Xi and the scanning line Yj, a pixel electrode for display Dpix formed by ITO (Indium Tin Oxide) as a transparent electrode is located on a thin film transistor TFT of the top gate structure having a polycrystalline silicon (p-Si) as an active layer via a passivation film INS3. In more detail, this TFT is formed in the double gate structure so as to diminish the off-leak current, and has P type source-drain regions p-Si (s), p-Si (d), channel regions p-Si (c1), p-Si (c2) and a connecting region p-Si (i) placed between the channel region p-Si (c1) and p-Si (c2) in the p-Si film. The drain region p-Si (d) is connected with the signal line Xi through a contact hole CH1. The source region p-Si (s) is pulled about by a source line EXT of Al through a contact hole CH2 and connected with the pixel electrode for display Dpix through a contact hole CH3.

On the p-Si film, a gate insulation film INS1 of TEOS is located. Furthermore, a first gate electrode G1 extended from the scanning line Yj is positioned and a part of the scanning line Yj is wired as a second gate electrode G2 on the gate insulation film. The first gate electrode G1 corresponds to the first channel region p-Si (c1), and the second gate electrode G2 corresponds to the second channel region p-Si (c2).

The source region p-Si (s) of the TFT includes a source region extended portion p-Si (se) (FIG. 6), and is electrically connected through a contact hole CH4 with a second auxiliary capacitance electrode EC2, which is located on a first auxiliary capacitance electrode EC1 of MoW extended from the auxiliary capacitance line Cj and prepared in the same process as the auxiliary capacitance line Cj, via an inter-layer insulation film INS2. The second auxiliary capacitance electrode EC2 is constituted of Al formed in the same process as the signal line Xi. Furthermore, on the second auxiliary capacitance electrode EC2, a pixel electrode for phase transition Tpix formed in the same process as the pixel electrode for display Dpix is positioned through a passivation film INS3, and the pixel electrode for phase transition Tpix is electrically connected with the second auxiliary capacitance electrode EC2 via a contact hole CH5.

According to the structure mentioned above, a holding capacitance Cs (FIG. 4) is formed between the first auxiliary capacitance electrode EC1 and the second auxiliary capacitance electrode EC2. Because the pixel electrode for phase transition Tpix is located on the holding capacitance Cs, a large holding capacitance Cs can be effectively assured without decreasing the aperture ratio.

Moreover, in this embodiment, because the pixel electrode for display Dpix and the pixel electrode for transition Tpix are located straddling the scanning line Yj and connected together through the source region extended portion p-Si (se) independent of the source region p-Si (s) of the TFT, remedy can easily be executed upon disconnecting electrically the source region extended portion p-Si (se) by means of e.g. laser radiation even if the holding capacitance Cs is shorted.

The pixel electrode for display Dpix of the neighboring horizontal line and the pixel electrode for phase transition Tpix, which are adjacent to each other on the auxiliary capacitance line Cj, are structured like a comb-teeth shape which has opposing edge sides thereof being engaged with each other. This structure can form uniformly a core of bend upon supplying a twisted transversal electric field between the pixel electrode for display Dpix and the pixel electrode for phase transition Tpix, so that the initial spray alignment condition can be uniformly led to the bend alignment condition. The comb-teeth pitch can lead to a uniform alignment at a low voltage by, for example, the pitch being smaller than 50 μm.

As shown in FIG. 4, both ends of the scanning line Yj are electrically connected with scanning line drive circuits Ydr1, Ydr2 integrally constituted on the glass substrate GLS1 respectively. A vertical scanning clock signal YCK and a vertical start signal YST are inputted to the scanning line drive circuits Ydr1 and Ydr2 respectively. The both ends of the auxiliary capacitance line Cj are connected to the connecting line Ccs so as to input the auxiliary capacitance voltage Vcs through the connecting line Ccs. The signal line Xi is connected to a signal input line xk (k=i/2) via a select switch SEL.

In detail, the signal lines Xi are divided into odd number signal lines Xi (i=1, 3, 5, . . . ) and even number signal lines Xi (i=2, 4, 6, . . . ), and a pair of neighboring odd number signal lines Xi, Xi+2 are connected to the same signal input line xk through select switches SEL1, SEL3, and a pair of neighboring even number signal lines Xi+1, Xi+3 are connected to the same signal input line xk+1 through select switches SEL2, SEL4. Wiring is carried out so as to satisfy following conditions: The select switch SEL1 connected to one of the odd number signal line pairs and the select switch SEL4 connected to one of the even number signal line pairs are selected by a first select signal Vsel1; and the select switch SEL3 connected to the other of the odd number signal line pairs and the select switch SEL2 connected to the other of the even number signal line pairs are selected by a second select signal Vsel2.

As shown in FIG. 8(a), for example, a signal voltage Vsig1 positive (+) to an opposing electrode voltage Vcom is written to the pixel electrode for display Dpix corresponding to the signal line X1, and a signal voltage Vsig4 negative (−) to the opposing electrode voltage Vcom is written to the pixel electrode for display Dpix corresponding to the signal line X4 in the first half of one horizontal scanning period (1H). A signal voltage Vsig2 negative (−) to an opposing electrode voltage Vcom is written to the pixel electrode for display Dpix corresponding to the signal line X2, and a signal voltage Vsig3 positive (+) to the opposing electrode voltage Vcom is written to the pixel electrode for display Dpix corresponding to the signal line X3 in the latter half of one horizontal scanning period (1H). As shown in FIG. 8(b), a signal voltage Vsig1 negative (−) to an opposing electrode voltage Vcom is written to the pixel electrode for display Dpix corresponding to the signal line X1, and a signal voltage Vsig4 positive (+) to the opposing electrode voltage Vcom is written to the pixel electrode for display Dpix corresponding to the signal line X4 in the first half of one horizontal scanning period (1H) of the next frame. A signal voltage Vsig2 positive (+) to an opposing electrode voltage Vcom is written to the pixel electrode for display Dpix corresponding to the signal line X2, and a signal voltage Vsig3 negative (−) to the opposing electrode voltage Vcom is written to the pixel electrode for display Dpix corresponding to the signal line X3 in the latter half of one horizontal scanning period (1H).

As mentioned above, frame inversion driving and dot inversion driving are carried out. Thereby, undesirable supply of DC voltage can be prevented and also occurrence of flicker can be effectively prevented. In addition, because number of connections between the signal line drive circuit 500 and the liquid crystal display panel 100 decreases to a half the number i of the signal lines Xi, connecting process thereof can be largely reduced and improvement of production yield, progress in anti-shock characteristic, etc. can be achieved thanks to a less number of connection. Furthermore, limitations of connection pitch accompanied by progress toward the high definition can be broadened. For example, high definition of less than 80 µm can be achieved.

In the embodiment described above, though the signal voltage Vsig inputted from a signal input line xk in one horizontal scanning period (1H) is serially divided into every other two signal lines Xi, Xi+2, it can be divided into three signal lines or four signal lines. Thereby, number of connection can be further decreased. However, increase in the number of dividing results in reduction of the writing time, so that it should be designed in accordance with the ability, etc. of the TFT.

<Structure of the Opposing Substrate>

As shown in FIG. 2 and FIG. 3, the opposing substrate 130 is constituted of a matrix-formed light shield layer BM interrupting undesirable leak-lights, filter layers CF(R), CF(G), CF(B) of red R, green G, and blue B provided so as to correspond to each of pixel electrodes for display dpixR, dpixG, and dpixB respectively acting as filters CF for color display, and a transparent opposing electrode Ecom of ITO on a glass substrate GLS2. Here, CF(B) is the thickest, and CF(G), CF(R) are formed in such a manner as to become thinner in this order. The opposing electrode Ecom prepared on the filters becomes uneven like steps, and thereby the gap distance between each pixel electrode and the opposing electrode has the relation represented by dB<dG<dR. CF(R), CF(G), CF(B) are arranged adjacently in order.

Post spacers of resin (not shown in the figure) are arranged on the opposing electrode Ecom in order to maintain the gap to the array substrate 110. the spacers are arranged regularly at a rate of one to a plurality of pixels. The position corresponding to the spacer on the array substrate is a broad area Xa on the signal line shown in FIG. 5.

FIG. 20 shows brightness ratio of each color corresponding to the gap distance between the electrodes at the viewing angle of 60 degrees to the right from the front direction of the display screen by an experiment. The retardation value of the liquid crystal display is set to be 80 nm.

In this figure, blue brightness ratio LRB becomes the minimum at dB1=4.8 µm; green brightness ratio LRG becomes the minimum at dG1=4.85 µm; and red brightness ratio LRR becomes the minimum at dR1=4.9 µm. Black floating becomes the minimum by setting the above gap distances for each color. However, because there is a disparity between the brightness ratios at the viewing angle of 60 degrees to the right, characteristics similar to FIG. 17 remain. Therefore, color balance is improved in comparison with a structure having a uniform gap distance, but the displayed image has the tinge of blue. Here, the gap distances between electrodes of the red and green pixels are increased to that of the blue pixel as they are represented by dB1=4.8 µm, dG2=5.0 µm and dR2=5.1 µm, in order to increase the brightness ratios of red and green. Then the characteristics shown by FIG. 18 can be obtained, so that the color balance at 60 degrees to the right, which has the greatest brightness ratio, became equal or similar to that at the front direction. The brightness ratio at 60 degrees to the left was also simultaneously improved.

From FIG. 20, when dR2 and dG2 are largely varied against dB1, which is to be the criteria, for the thickness of liquid crystal layer of 4.0 µm to 5.5 µm, the brightness of the black display rises undesirably and the contrast decreases if observation is carried out from an oblique direction. Therefore, increment of the gap distance between the electrodes for red and green pixel electrodes is set to be 1/10 of the gap distance between the electrodes for blue pixel.

On the other hand, if a step larger than 0.4 µm exists quantitatively in the panel, transmission of spray-bend transfer is extremely inhibited in the start-up period. Spray orientation remains in the panel, and transfer defect is generated.

In view of the above, it is specifically desirable to suppress the gap distances in the followings:

$|dB-dR| \leq 0.4$ µm $|dB-dG| \leq 0.4$ µm.

If $|dB-dR| \leq 0.3$ µm or $|dB-dG| \leq 0.3$ µm is satisfied, occurrence of light leakage due to unevenness of rubbing caused by the step can be remarkably diminished. It is therefore further desirable because the front contrast can be prevented from decreasing.

<Structure of the Liquid Crystal Display Panel>

The structure of the liquid crystal display panel 100 will be explained next in more detail.

As shown in FIG. 2, rubbing process is executed on orientation films 151 and 153 positioned on the respective main surfaces of the opposing substrates 120 and 130, in such a manner that rubbing directions Ra and Rb (Refer to FIG. 9 and FIG. 10) are vertically in approximately parallel together and in the same direction on the substrates 120 and 130. Pre-tilt angle (θ) is set to be approximately 10 degrees. The liquid crystal layer 140 is interposed by both the substrates 120 and 130. Positive dielectric constant anisotropic p-type nematic liquid crystal whose molecules take the bend alignment when a predetermined voltage is supplied to the pixel electrode for display Dpix and the opposing electrode Ecom is employed for the liquid crystal layer 140.

As shown in FIG. 10(*a*), liquid crystal molecules 140*a* of the liquid crystal layer 140 take the spray alignment when a voltage is not supplied between the pixel electrode for display Dpix and the opposing electrode Ecom. Consequently, in order to shift to the bend alignment, a high voltage of about several ten volts is supplied between the pixel electrode for display Dpix and the opposing electrode Ecom when the power is turned on. For carrying out surely the phase transition, a voltage of reverse polarity is written sequentially into every neighboring horizontal pixel line when the high voltage is supplied. Thereby nucleation is carried out upon giving a transversal twisted potential difference between the neighboring pixel electrode for display Dpix and the opposing electrode Ecom, and phase transition is carried out around the core. The spray alignment state is transferred to the bend alignment state by executing such action for about 1 sec., and furthermore the potential difference between the pixel electrode for display Dpix and the opposing electrode Ecom is set to be the same potential so as to erase undesirable history once.

After the liquid crystal layer is transferred to the bend alignment state like the above, a voltage higher than a low off-voltage Voff is supplied to the liquid crystal molecules 140a to maintain the bend alignment state while it is operated as shown in FIG. 10(b). Upon varying the voltage in the range between the off-voltage and the on-voltage higher than the off-voltage, alignment state is changed between FIG. 10(b) and FIG. 10(c) and the retardation value of the liquid crystal layer 140 is changed by λ/2 to control the transmittance.

To achieve such operation, absorption axes Aa and Ab of a pair of alignment layers 220a and 220b are arranged to be orthogonal together and shifted from the rubbing directions Ra, Rb by π/4 in order to become the black display when the on-voltage is applied as shown in FIG. 9.

A front hybrid phase difference plate 200a and a rear hybrid phase difference plate 200b stuck between the outer surfaces of the array substrate 120 and the opposing substrate 130 and the alignment layers 220a, 220b compensate the retardation value RLCon (e.g. 80 nm) of the liquid crystal layer 140 when on-voltage is applied (in the black display), and moreover prevent undesirable leak of light from the front and oblique directions in the black display. Namely, the discotic liquid crystal constituting the hybrid phase difference plates 200a, 200b is an optically negative material whose refractive indices nx and ny are the same and whose refractive index nz in the optical axis is smaller than nx, ny. As shown in FIG. 9 and FIG. 10, the molecular optical axis Dopt tilts in the reverse direction to the oblique direction of the optical axis of the liquid crystal molecules 140a of the liquid crystal layer 140. The liquid crystal is so constituted that the tilting angle varies gradually in the direction of film thickness, and the retardation values RD are 40 nm. Therefore, because the retardation value RLCon of the liquid crystal layer 140 is 80 nm in the black display, phase difference in the black display is compensated and thereby undesirable leak of light can be prevented.

Between the hybrid phase difference plates 200a, 200b and the alignment layers 220a, 220b, double-axial phase difference plates 210a, 210b are provided respectively. The double-axial phase difference plates 210a, 210b prevent leak of light caused by the optical rotatory property of the liquid crystal layer 140 in an oblique direction, and absorption axes Aa, Ab of the alignment layers 220a, 220b are coincided with the slow axis Ad. In consequence, the phase difference from the front direction can be approximately zero by combination with the alignment layers 220a, 220b, so that only wavelength dispersion in an oblique direction can be selectively improved.

<Structure of the Backlight>

Referring to FIG. 11, a backlight 300 located facing the alignment layer 220b will be explained.

The backlight 300 is comprised of a plurality of tubular light sources 310 arranged in parallel together as shown in the figure, a resin reflector 320 accommodating the tubular light sources 310 and emitting effectively the light from the tubular light sources 310 in the front direction, and an optical sheet located between the alignment layer 220b (Refer to FIG. 3) and the tubular light sources 310.

The optical sheet comprises a diffusion plate 340 of e.g. TDX of Asahi Kasei Co. for assuring brightness uniformity, and prism sheets 350, 360 of e.g. BEFIII of 3M Inc., which has a plurality of prism rows condensing the light emitted from the tubular light sources 310.

The tubular light source 310 is constituted of a lamp of high color rendering property represented by the three-wavelength cold cathode fluorescent tube having, for example, the luminous spectrum, which has a red light region with a peak at 610 nm, a green light region with a peak at 540 nm and a blue light region with a peak at 435 nm, as shown by the curve A of FIG. 12. Y2O3:Eu fluorescent material for red, LaPO4:Ce, Tb fluorescent material for green and BAM fluorescent material for blue are used as the fluorescent material excited by a ultraviolet ray of 147 nm in the case of employing xenon gas as the discharge gas of the lamp. However, other fluorescent materials are used in many cases. There is not a great difference between them as the luminous spectrum to obtain a high color rendering property.

Respective color filter layers CF(R), CF(G), CF(B) of the liquid crystal have the passing property C, the red filter layer CF(R) having the passing property of 580 nm or more represented by CR, the green filter layer CF(G) having the passing property of 580 to 510 nm represented by CG, and the blue filter layer CF(B) having the passing property of 550 to 400 nm represented by CB.

<Display Operation>

In accordance with the structure mentioned above, the light emitted from the tubular light source 310 passes through the alignment layer 220b via the light passage L as shown in FIG. 9. Here, only the polarized light having passed the transmission axis orthogonal to the absorption axes Aa, Ab of the alignment layer 220b is emitted, and enters into the liquid crystal display cell 110 through the rear double-axial phase difference plate 210b and the rear hybrid phase difference plate 200b.

Because the summed retardation of the liquid crystal layer 140 and the whole phase difference plates is approximately zero in the normal direction at on-voltage, the polarized light passes through as it is, and reaches the alignment layer 220a of the front side. The alignment layers 220a, 220b are positioned in the crossed-Nicol configuration alignment, so that the polarized light is absorbed by the front alignment layer 220a. Therefore the polarized light is cut off and the black display can be obtained.

As the retardation of the liquid crystal layer 140 varies in accordance with voltage supplying condition between the on-voltage and the off-voltage and thereby difference from the retardation of the whole phase difference plates varies, the incident light emitted from the front double-axial phase difference plate 210a becomes ecliptic polarization and reaches the front alignment layer 220a, so that the light passes through in accordance with the polarization condition. As mentioned above, gradation display can be done upon varying the applied voltage.

Though the light passage L shown in the figure designates the front direction of the display screen, the brightness ratio at a direction oblique to the light passage L becomes greater than the front direction as shown in FIG. 18. When the gap distances of respective pixel electrodes are set to be as follows; dB=4.8 μm, dG=5.0 μm, and dR=5.1 μm, then they satisfy the following:

$$dB/(dR+dG+dB)=0.32.$$

However, the tinge of blue in the black display at the viewing angle in an oblique direction can be remarkably suppressed in the range of 0.3<dB/(dR+dG+dB)<0.45.

Embodiment 2

FIG. 13 shows another embodiment of the present invention, where the same portion as that of FIG. 2 will be denoted by the same mark and explanation thereof will be omitted. Difference between this embodiment and the embodiment shown in FIG. 2 is that the gap distances dR and dG of the red filter layer CF(R) and the green filter layer CF(G) respectively are the same and different from the gap distance dB of the blue filter layer CF(B), i.e. dB<dR=dG. According to this embodiment, because the thicknesses of the red and green filter layer are the same, manufacture thereof can be facilitated and moreover the tinge of blue in the displayed image in the right and left oblique directions can be suppressed.

Embodiment 3

The embodiment shown in FIG. 14 has the structure in which the thicknesses of the inter-layer insulation films INS under the pixel electrodes Dpix of the array substrate 120 are varied for every color pixel electrodes dpixB, dpixG, and dpixR. The filters CF and the opposing electrode Ecom on the opposing substrate 130 are flat, and gap distances between electrodes dB, dG, dR are set to be increased in this order. According to this structure, the tinge of blue in the oblique viewing angle is improved like the embodiment 1. Any portion denoted by the same mark as FIG. 2 represents the same portion, so that explanation thereof will be omitted.

Embodiment 4

In the embodiment shown in FIG. 15, the filters CF are arranged on the array substrate 120 side and the thicknesses of the blue filter layer CF(B), the green filter layer CF(G) and the red filter layer CF(R) are varied. The relation dB<dG<dR is satisfied by making the blue filter layer thickest and making the others thin in this order. According to this structure, the tinge of blue in the oblique viewing angle is improved like the embodiment 1. Any portion denoted by the same mark as FIG. 2 represents the same portion, so that explanation thereof will be omitted.

By the embodiments mentioned above, the structure in which the gap distances between the electrodes are varied for every color pixel electrodes. However, the gap distances between the electrodes can also be varied upon varying the thicknesses of the pixel electrodes, the opposing electrode and the orientation film. Furthermore, it goes without saying that a structure having different gap distances between the electrodes can be achieved by not only these individual elements but also combination of a plurality of the elements.

EXPLANATION OF THE MARKS

Figure 1:
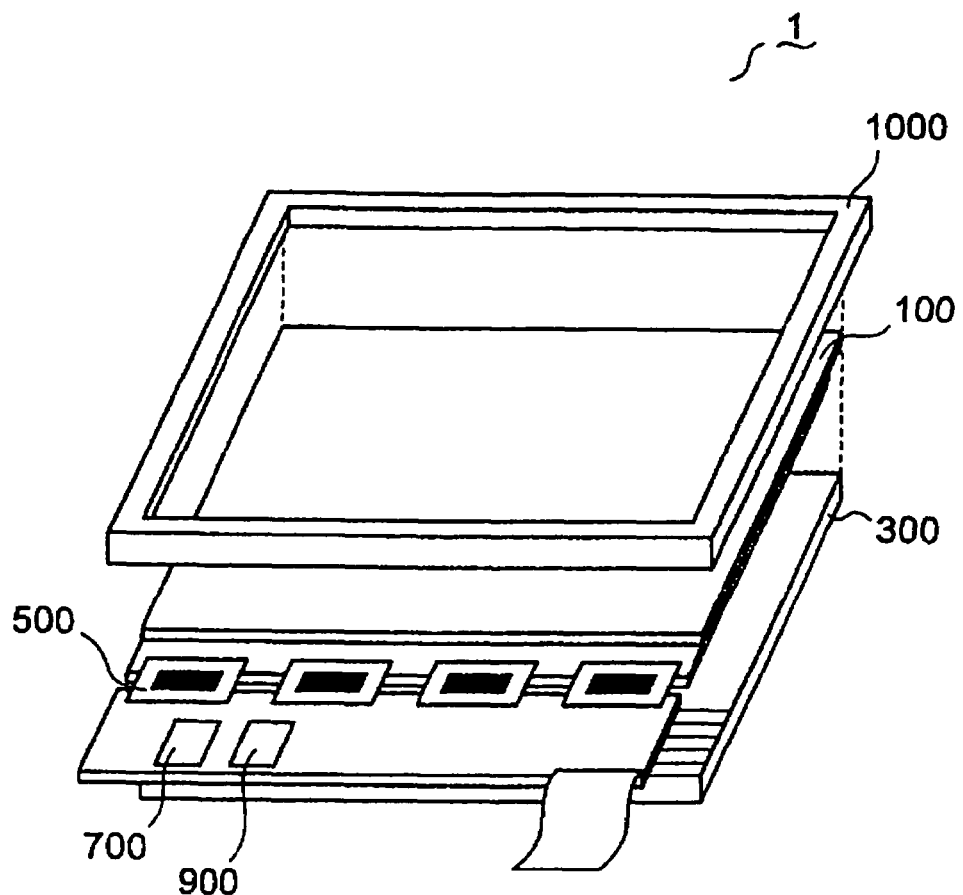
FIG. 1 is a schematic block diagram of the liquid crystal display device according to the embodiment 1 of the present invention.
Figure 2:
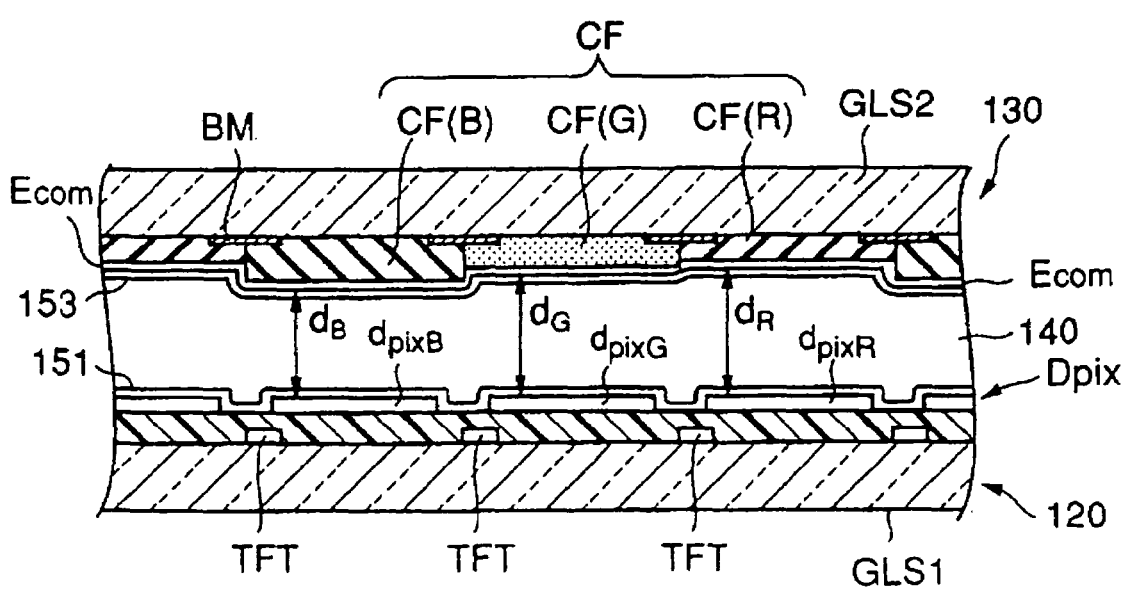
FIG. 2 is a partial cross sectional view of the liquid crystal display cell according to the embodiment 1.
Figure 3:
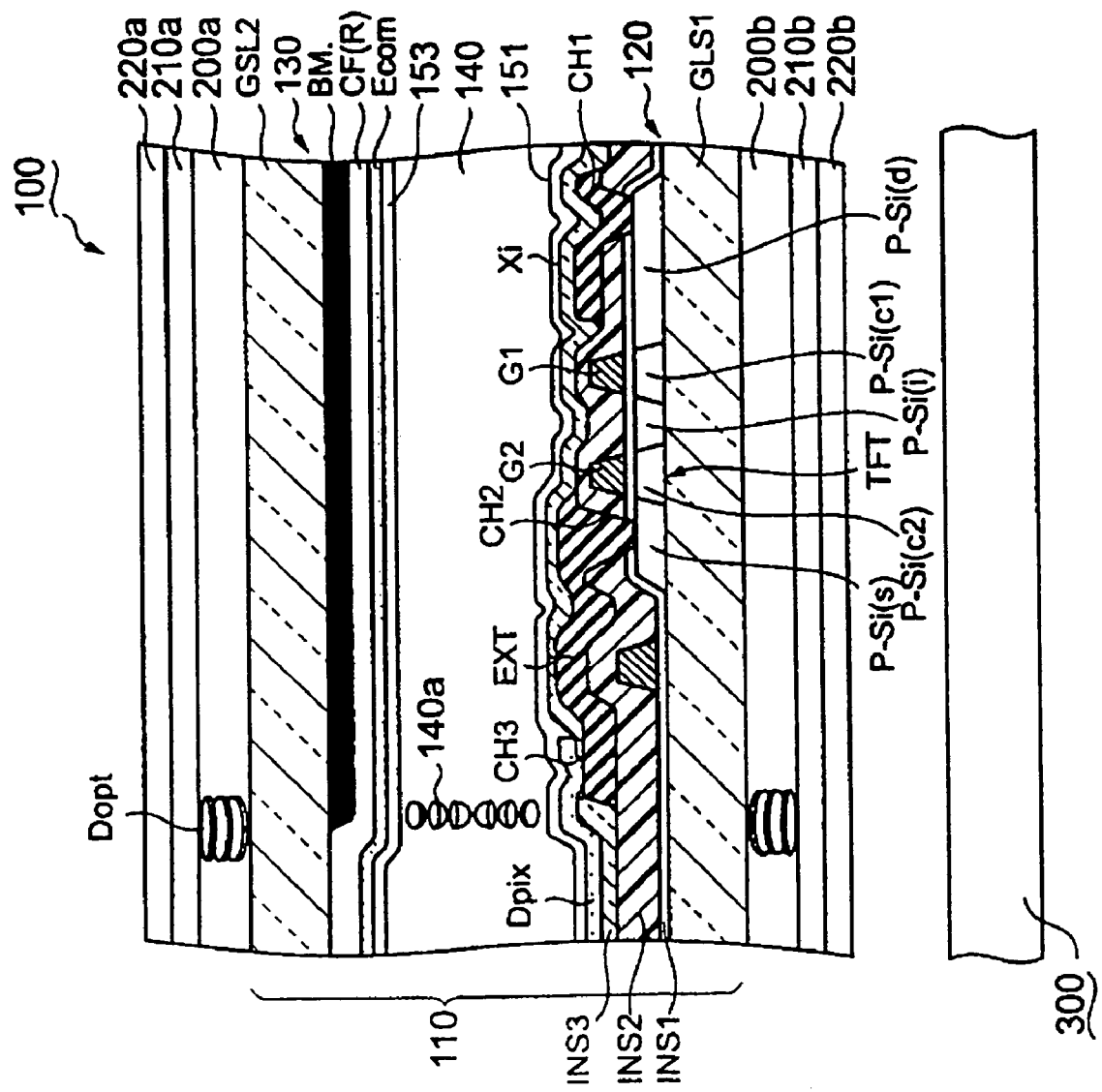
FIG. 3 is an enlarged partial cross sectional view of the liquid crystal display panel according to the embodiment 1.
Figure 4:
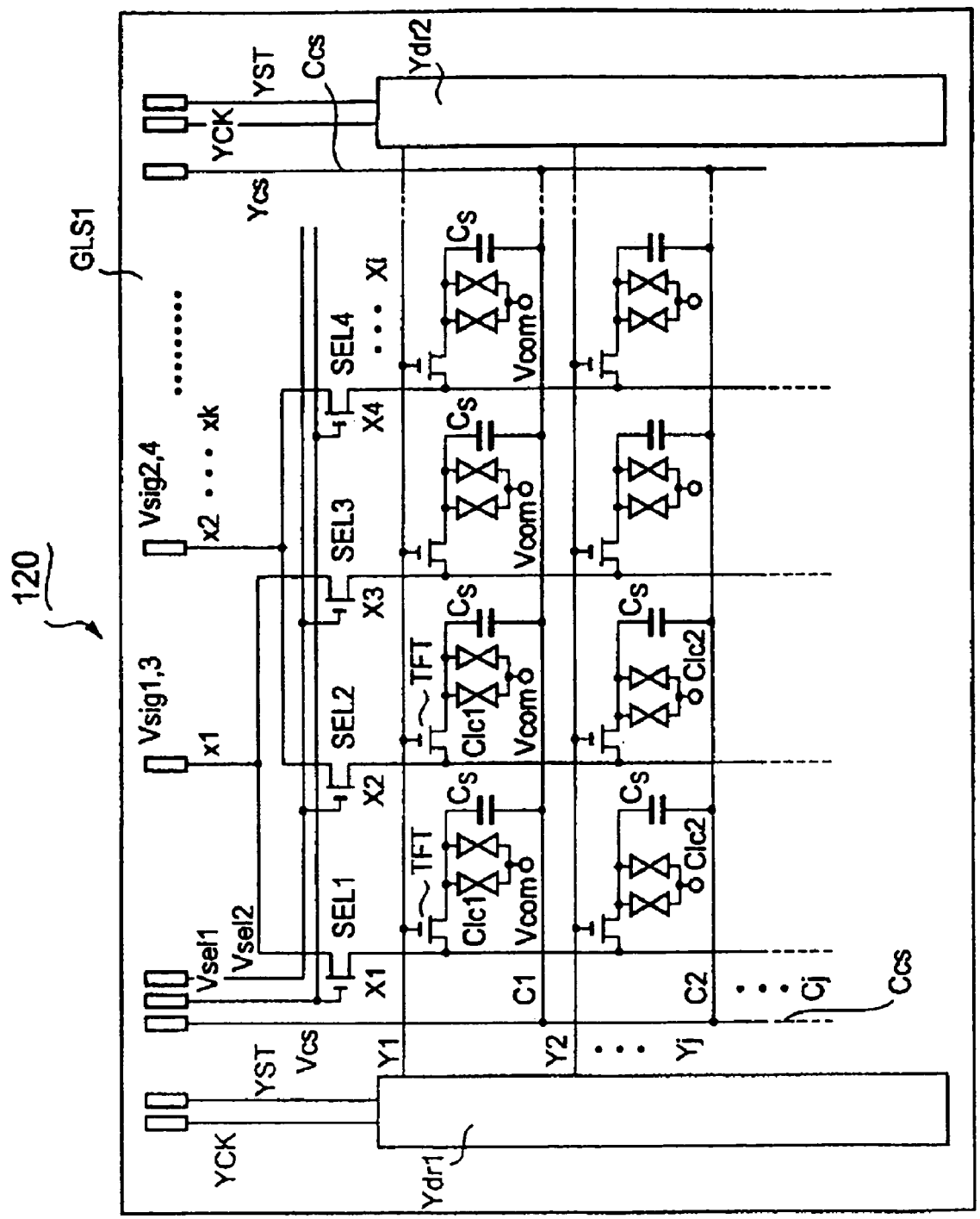
FIG. 4 is a schematic equivalent circuit diagram of the liquid crystal display cell according to the embodiment 1.
Figure 5:
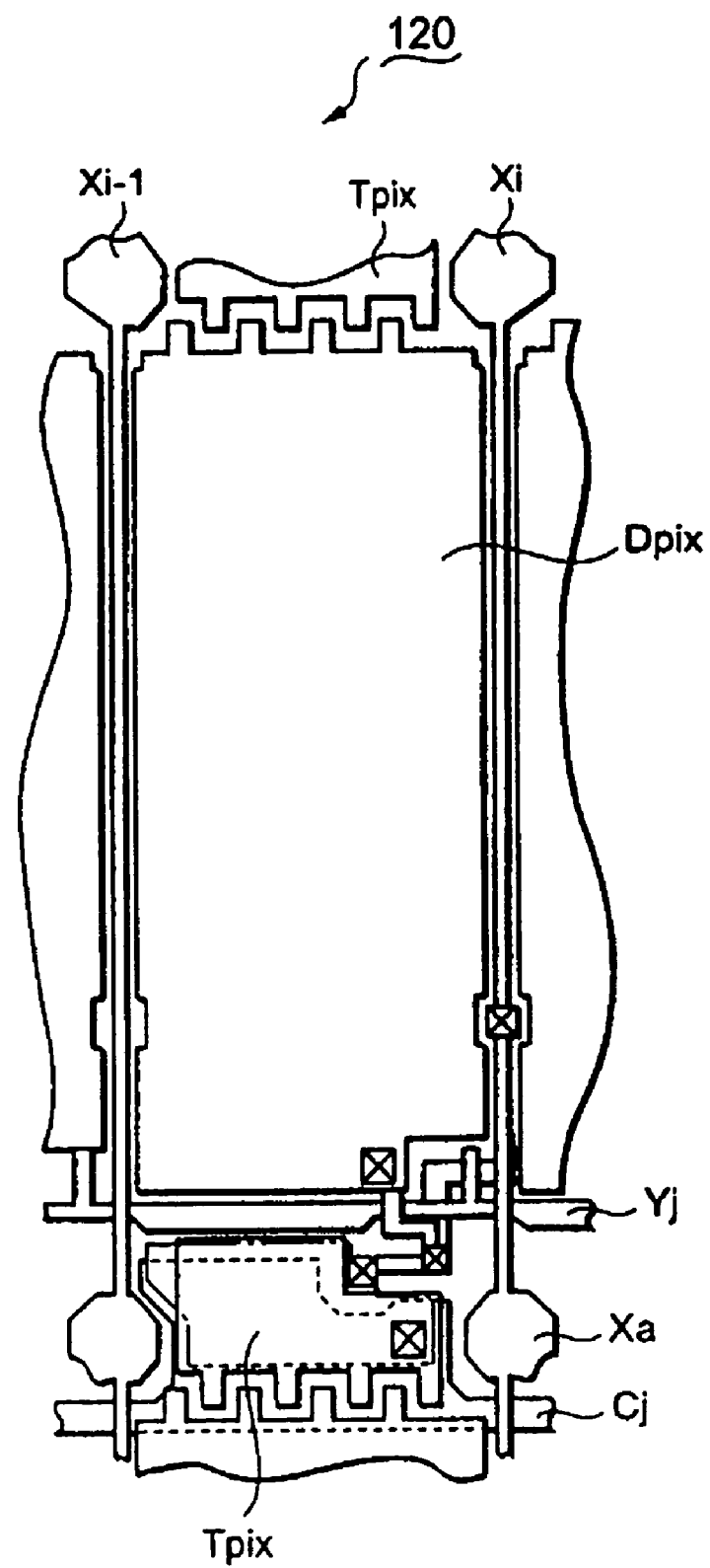
FIG. 5 is a partial schematic front view of the array substrate according to the embodiment 1.
Figure 6:
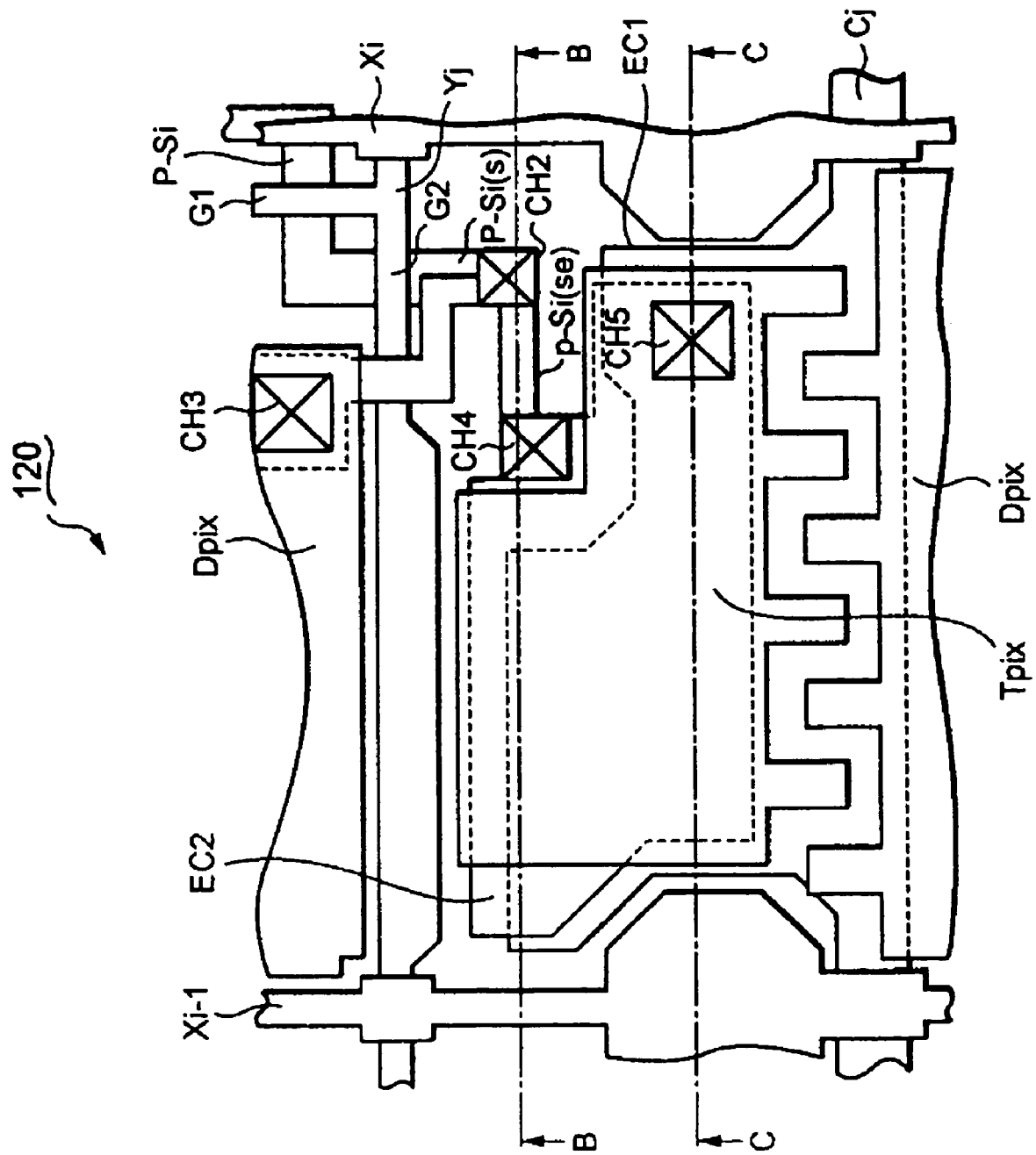
FIG. 6 is a partial schematic front view of the array substrate according to the embodiment 1.
Figure 7:
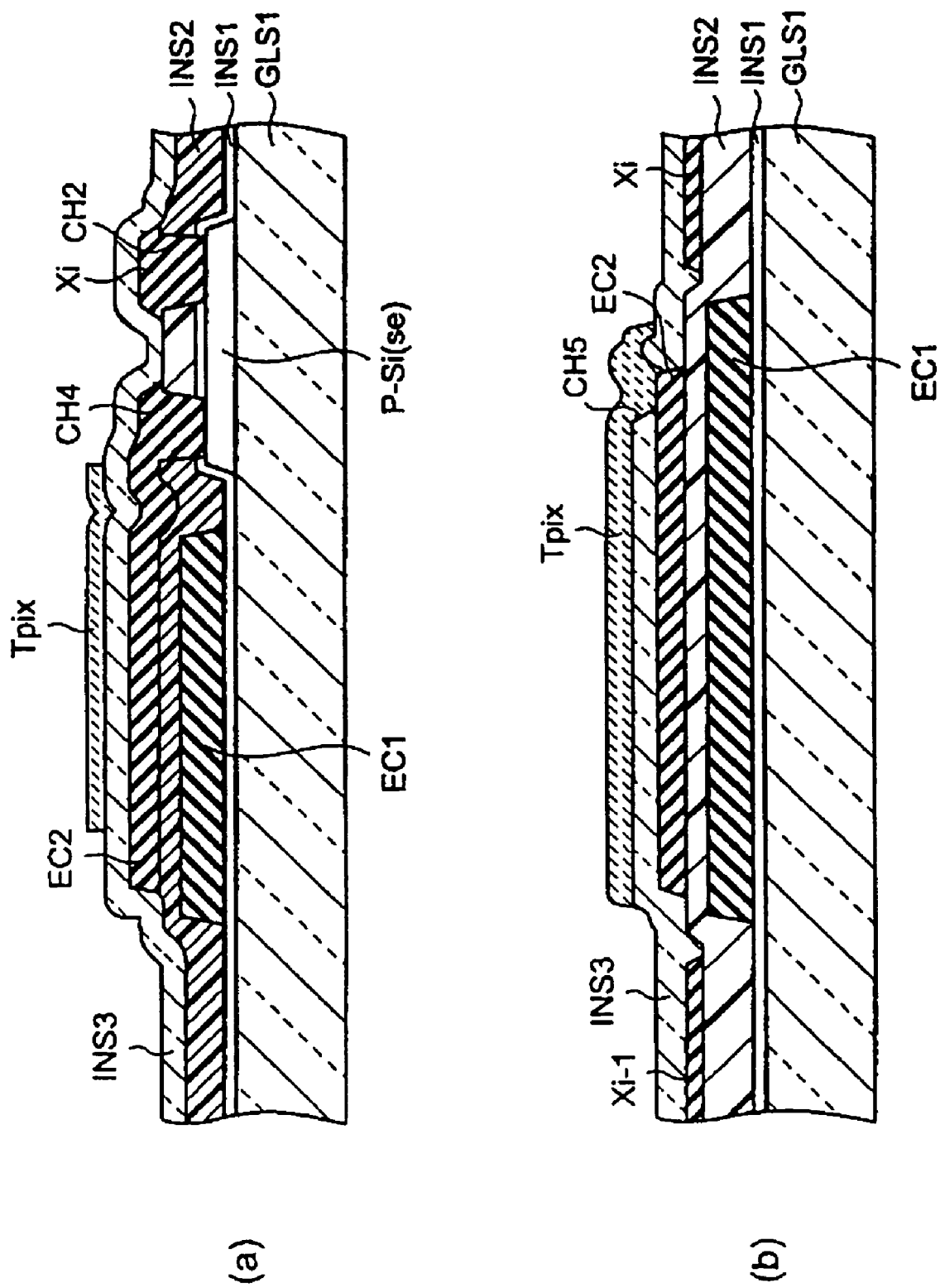
FIG. 7(a) is a partial schematic cross sectional view of the array substrate cut along B-B line in FIG. 6
FIG. 7(b) is a partial schematic cross sectional view of the array substrate cut along C-C line in FIG. 6.
Figure 8:
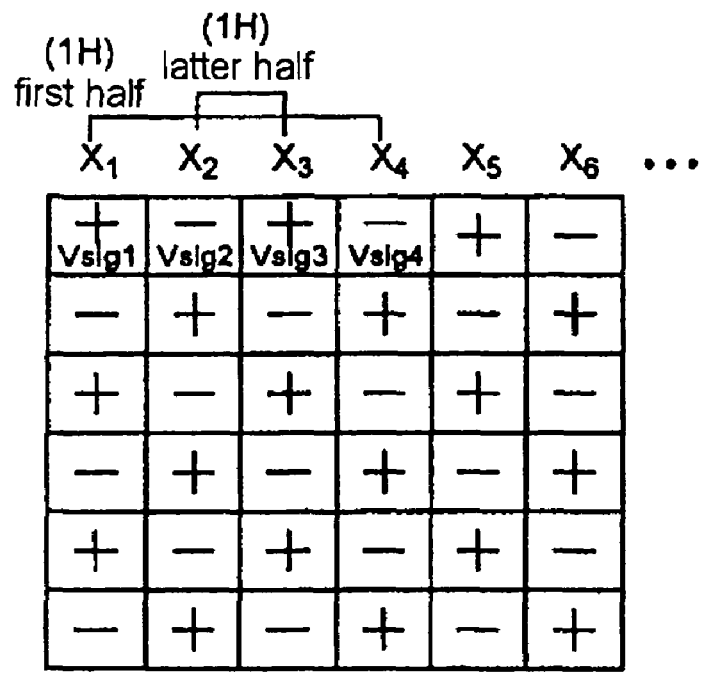
FIG. 8(a) and FIG. 8(b) are diagrams explaining the displaying condition of the embodiment 1.
Figure 8:
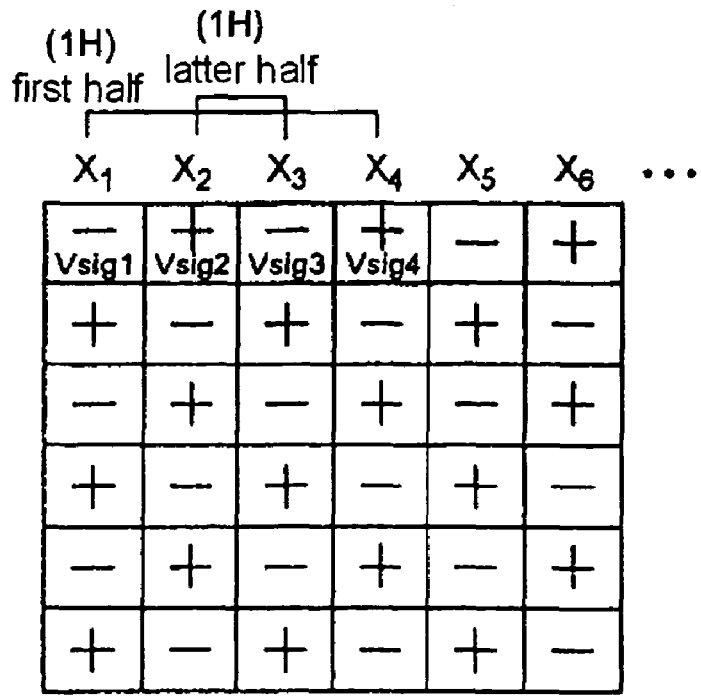
Figure 9:
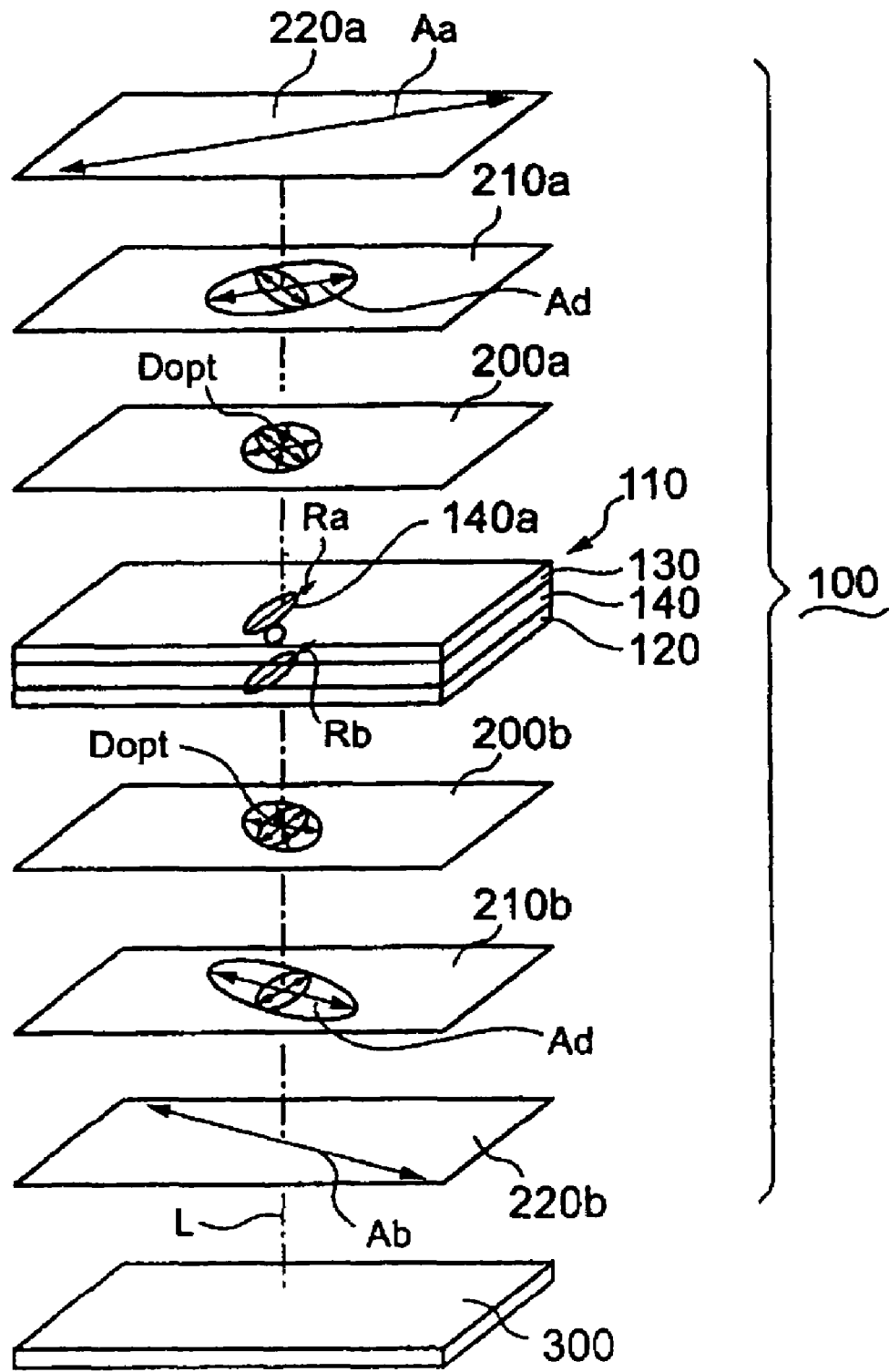
FIG. 9 is a schematic block diagram of the liquid crystal display panel according to the embodiment 1.
Figure 10:
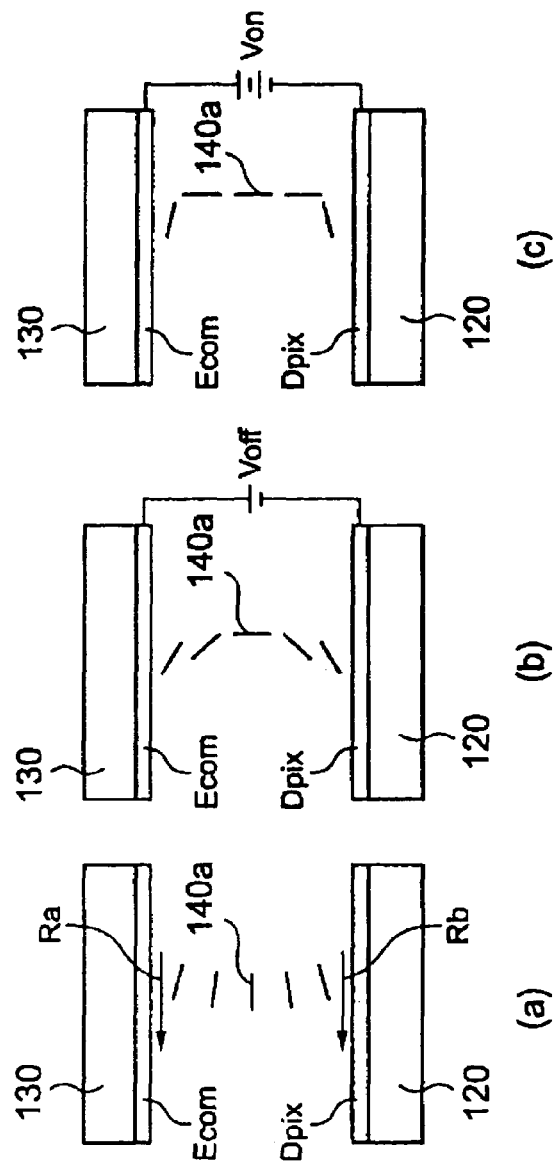
FIG. 10(a), FIG. 10(b) and FIG. 10(c) are schematic diagrams explaining operation of the embodiment 1.
Figure 11:
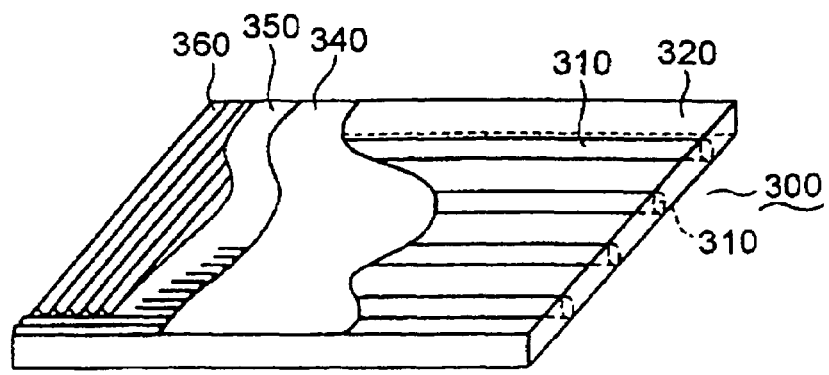
FIG. 11 is a schematic cross sectional view of the backlight according to the embodiment 1.
Figure 12:
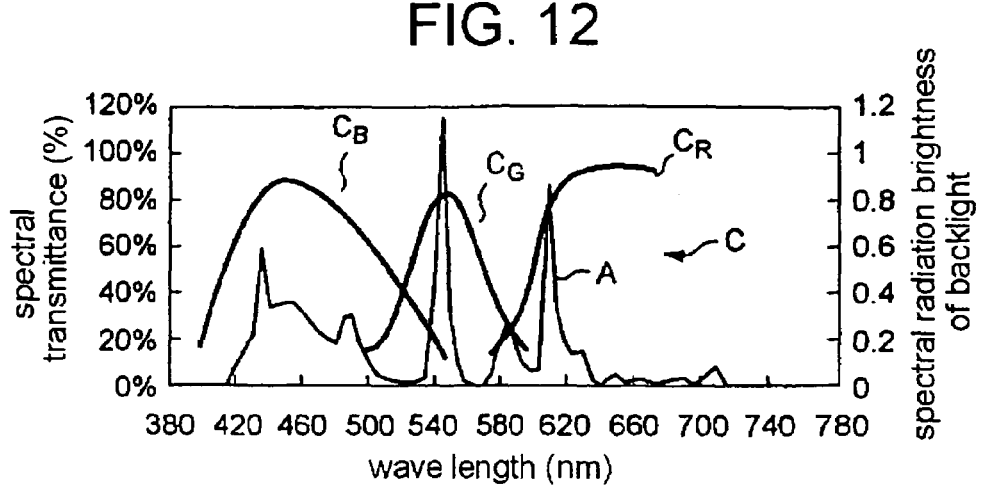
FIG. 12 is a diagram of curves showing the spectral radiation brightness characteristics of the lamp of the backlight, and the spectral transmittance of the red, green, blue filter layers.
Figure 13:
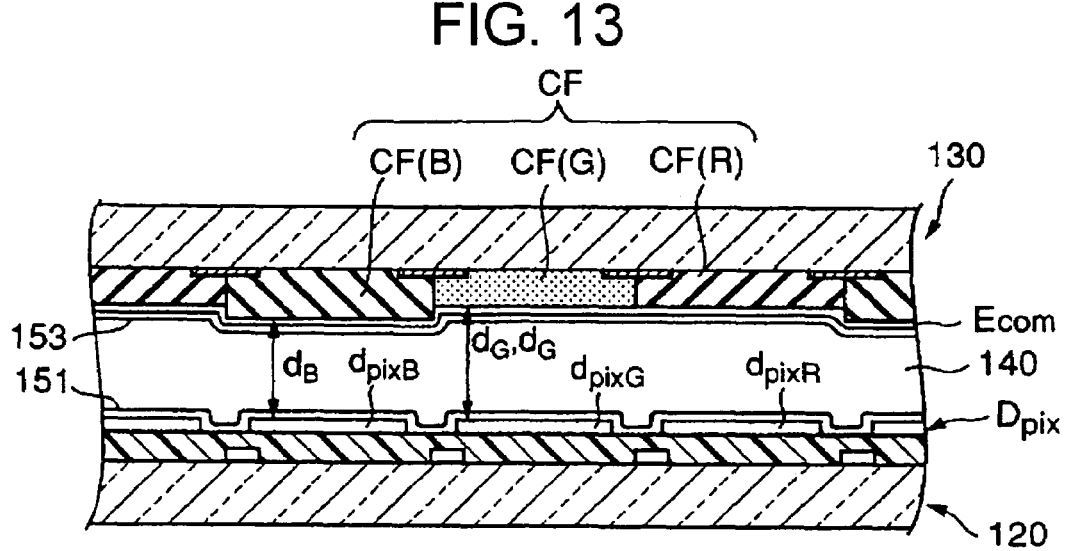
FIG. 13 is a schematic cross sectional view showing the structure of the liquid crystal display cell according to the embodiment 2 of the present invention.
Figure 14:
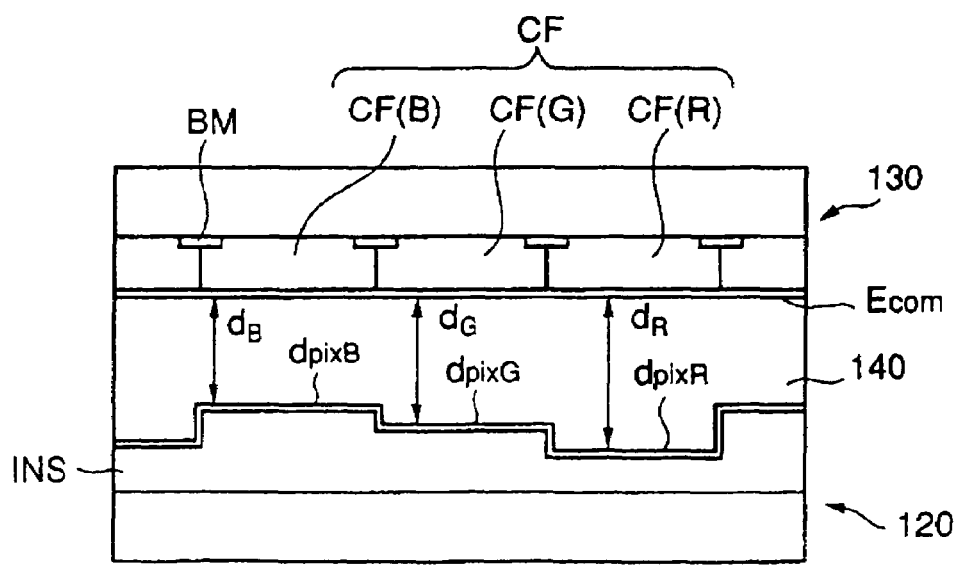
FIG. 14 is a schematic cross sectional view showing the structure of the liquid crystal display cell according to the embodiment 3 of the present invention.
Figure 15:
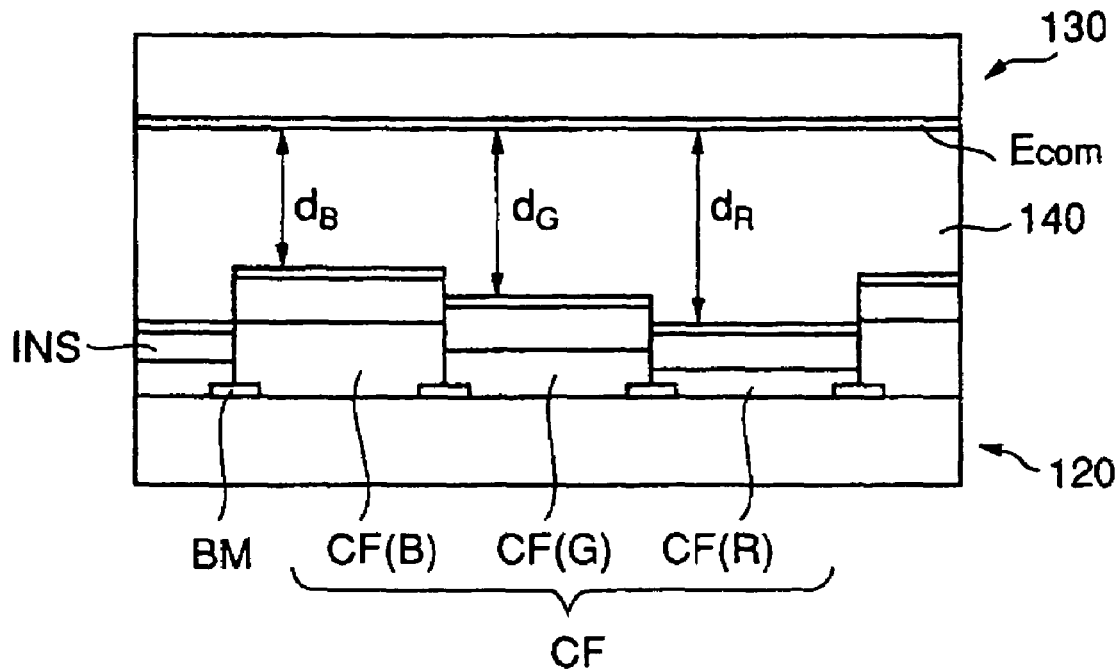
FIG. 15 is a schematic cross sectional view showing the structure of the liquid crystal display cell according to the embodiment 4 of the present invention.
Figure 16:
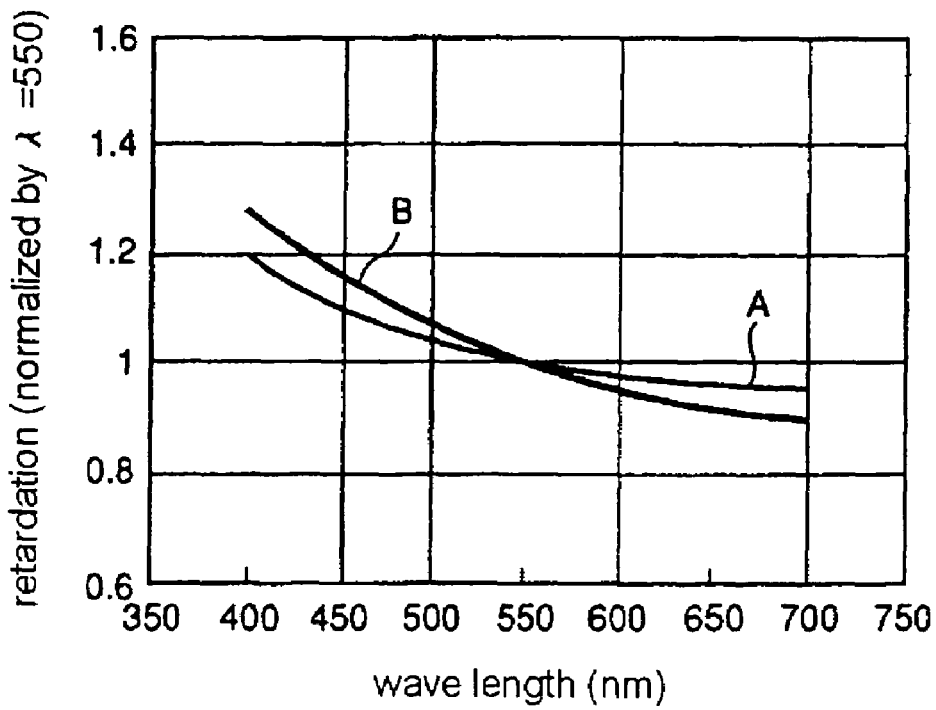
FIG. 16 is a diagram of curves explaining variation of the retardation value of the liquid crystal layer and the phase difference plate to the wavelength of light.
Figure 17:
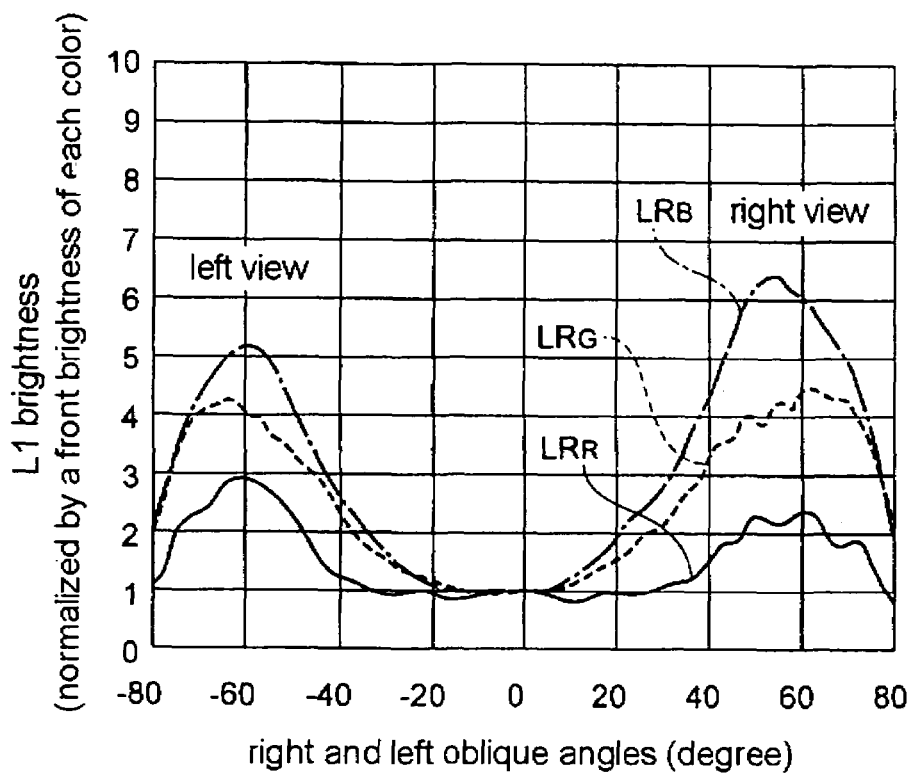
FIG. 17 is a diagram of characteristic curves explaining the spectral brightness ratios of the display screen at the right and left angles of visibility in the black display.
Figure 18:
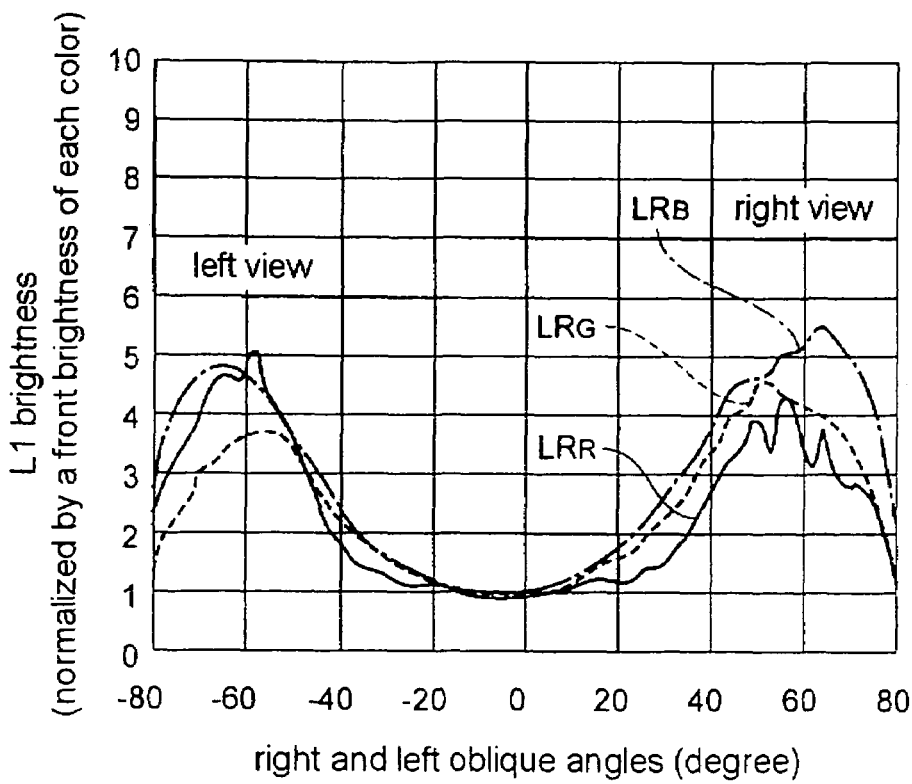
FIG. 18 is a diagram of characteristic curves of respective color brightness ratios of the display screen at the right and left oblique angles of visibility in the black display according to the embodiment 1.
Figure 19:
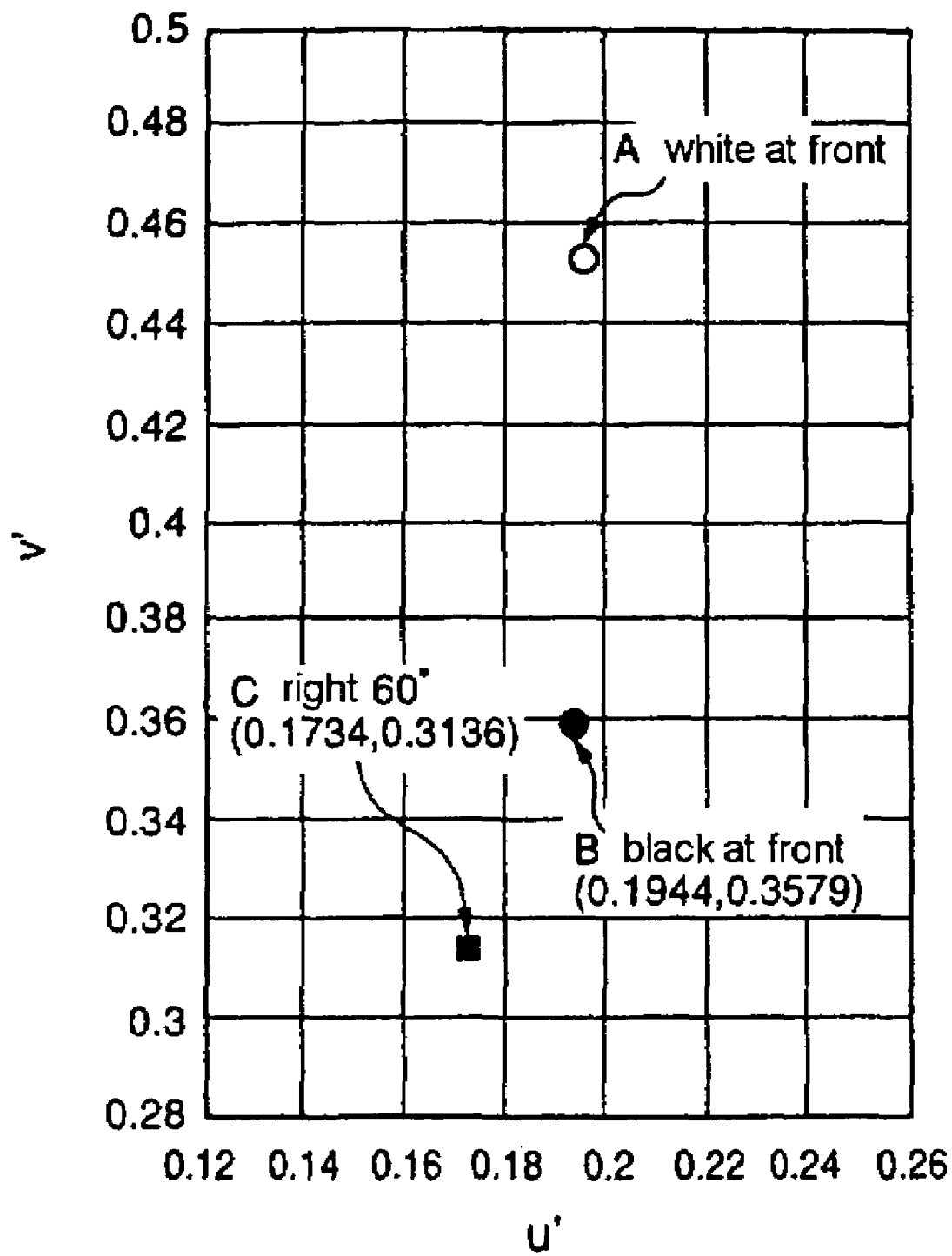
FIG. 19 is a u'v' chromaticity diagram explaining the color balance of the display screen according to the embodiment 1.
Figure 20:
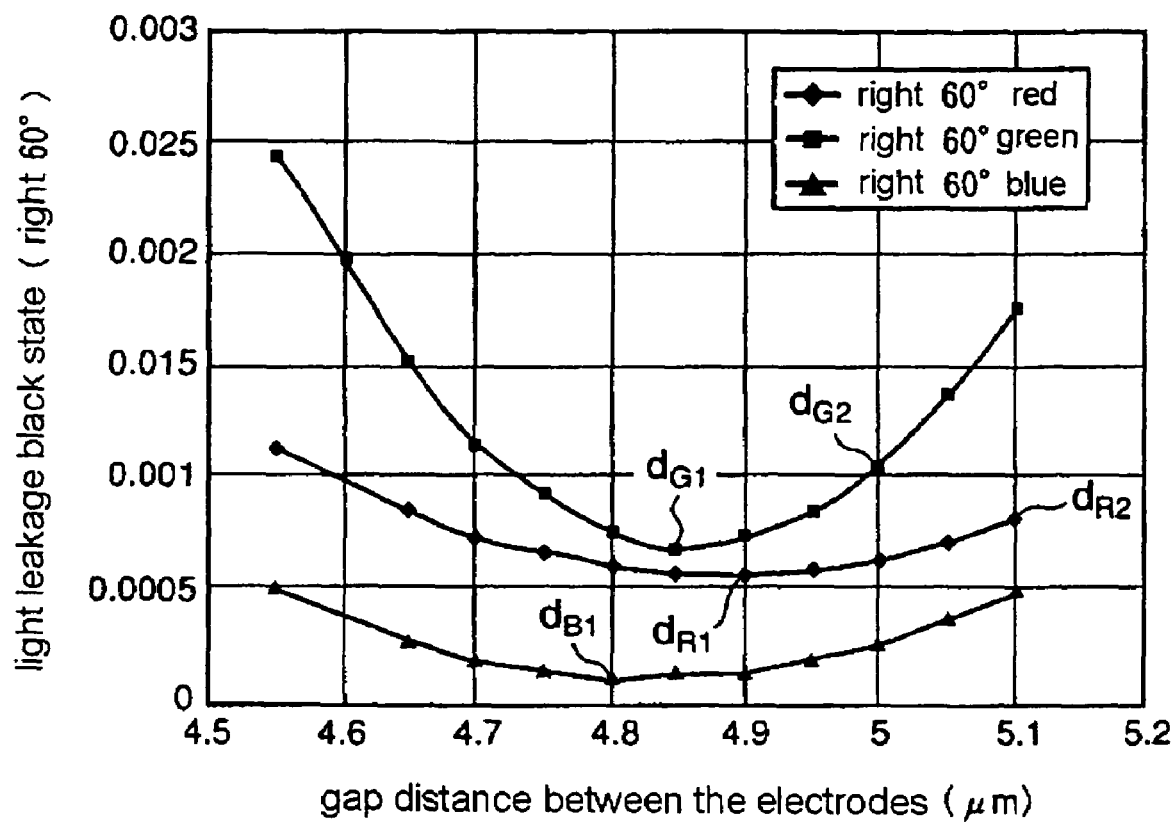
FIG. 20 is a diagram of characteristic curves of black floating (brightness) at 60 degrees to the right against the gap distance between the electrodes according to the embodiment 1.
Figure 21:
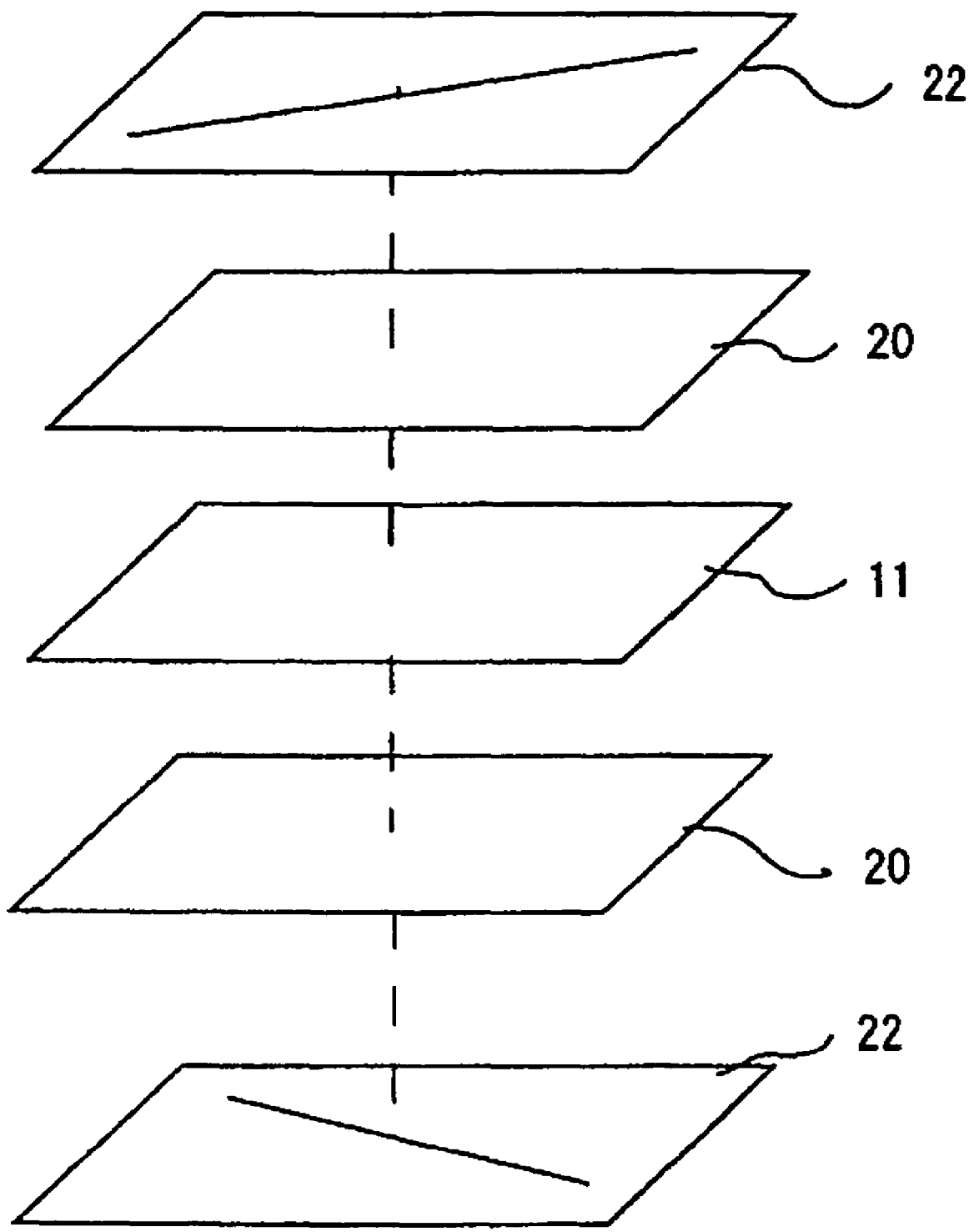
FIG. 21 is a schematic block diagram of the general OCB mode liquid crystal display cell.

110: liquid crystal display cell
120: array substrate
Dpix: pixel electrode
130: opposing substrate
Ecom: opposing electrode
dB, dG, dR: gap distance between the electrodes
CF(R), CF(G), CF(B): filter layer
140: liquid crystal layer
200a, 200b: hybrid phase difference plate
220a, 220b: alignment layer
300: back light

What is claimed is:
1. A liquid crystal display device comprising:
an array substrate having pixel electrodes for each color of red, green and blue arranged in a matrix form;
an opposing substrate having opposing electrodes arranged in such a manner as to face the pixel electrodes of the array substrate;
a liquid crystal layer arranged in a bend alignment interposed between the array substrate and the opposing substrate; and
a filter comprising a red filter layer, a green filter layer and a blue filter layer provided on one side of the substrate, the red filter layer being arranged corresponding to the red pixel electrode, the green filter layer being arranged corresponding to the green pixel electrode, and the blue filter layer being arranged corresponding to the blue pixel electrode, wherein a gap distance between the blue pixel electrode and the opposing electrode is different from a gap distance between the red pixel electrode and the opposing electrode, and also different from a gap distance between the green pixel electrode and the opposing electrode, and satisfies followings:

$dB < dR, dB < dG$ and $|dB - dR| \leq 0.4$ μm, $|dB - dG| \leq 0.4$ μm, where the gap distance between the blue pixel electrode and the opposing electrode is represented by dB; the gap distance between the red pixel electrode and the opposing electrode is represented by dR; and the gap distance between the green pixel electrode and the opposing electrode is represented by dG, and wherein either the dR or the dG is larger than a gap distance which minimizes the brightness ratio at the viewing angle of 60 degrees to the right.

2. The liquid crystal display device as set forth in claim 1, wherein $dB < dG \leq dR$ is satisfied, where the gap distance between the blue pixel electrode and the opposing electrode is represented by dB; the gap distance between the red pixel electrode and the opposing electrode is represented by dR; and the gap distance between the green pixel electrode and the opposing electrode is represented by dG.

3. The liquid crystal display device as set forth in claim 1, wherein at least the thickness of the blue filter layer is greater than the thicknesses of the red and green filters.

4. The liquid crystal display device as set forth in claim 1, wherein the filter is located on the array substrate.

5. The liquid crystal display device as set forth in claim 1, wherein the filter is located on the opposing substrate.

6. The liquid crystal display device as set forth in claim 1, wherein the liquid crystal display device further comprises a phase difference plate and a pair of alignment layers placed above and below a display screen of the liquid crystal display device so as to interpose the liquid crystal display device and the phase difference plate, crossing together at approximately 45 degrees, and arranged in crossed-Nicol configuration to each other.

7. A liquid crystal display device comprising;

a liquid crystal display cell comprising an array substrate having pixel electrodes for each color of red, green and blue arranged in a matrix form on a display screen, an opposing substrate having opposing electrodes arranged in such a manner as to face the pixel electrodes of the array substrate, an orientation film formed on both the pixel electrodes and the opposing electrodes, and having a liquid crystal orientation surface in a direction vertical to the display screen, a liquid crystal layer interposed between the array substrate and the opposing substrate, and arranged in a bend alignment oriented in a direction vertical to the display screen, and a filter comprising a red filter layer, a green filter layer and a blue filter layer provided on one side of the substrate, the red filter layer being arranged corresponding to the red pixel electrode, the green filter layer being arranged corresponding to the green pixel electrode, and the blue filter layer being arranged corresponding to the blue pixel electrode, wherein a gap distance between the blue pixel electrode and the opposing electrode of the liquid crystal display device is different from a gap distance between the red pixel electrode and the opposing electrode, and also different from a gap distance between the green pixel electrode and the opposing electrode;

a phase difference plate arranged on at least one of main surfaces of the liquid crystal display cell;

a pair of alignment layers arranged interposing the substrate and the phase difference plate in crossed-Nicol configuration crossing at approximately 45 degrees to each other in a direction vertical to the display screen; and a means for satisfying $LRB/(LRR+LRG+LRB) < 0.45$, where ratios of brightness of each color light in directions of 60 degrees right and left from the front direction of the display screen are represented by LRR for red light, LRG for green light and LRB for blue light respectively.

8. The liquid crystal display device as set forth in claim 7, wherein relationships $|dB - dR| \leq 0.4$ μm and $|dB - dG| \leq 0.4$ μm, are satisfied, where the gap distance between the blue pixel electrode and the opposing electrode is represented by dB; the gap distance between the red pixel electrode and the opposing electrode is represented by dR; and the gap distance between the green pixel electrode and the opposing electrode is represented by dG.

9. The liquid crystal display device as set forth in claim 1, wherein the liquid crystal display device is provided with a backlight.

10. The liquid crystal display device as set forth in claim 8, wherein the liquid crystal display device is provided with a backlight.

* * * * *